United States Patent
Fieldhouse et al.

(10) Patent No.: US 7,205,374 B2
(45) Date of Patent: Apr. 17, 2007

(54) TWO-PART POLYURETHANE ADHESIVE FOR BONDING INSULATION BOARDS TO A ROOF DECK

(75) Inventors: John W. Fieldhouse, Carmel, IN (US); Joseph J. Kalwara, Indianapolis, IN (US); Edward G. Kane, Carmel, IN (US); John B. Letts, Carmel, IN (US)

(73) Assignee: BFS Diversified Products, LLC, Carmel, IN (US)

( * ) Notice: Subject to any disclaimer, the term of this patent is extended or adjusted under 35 U.S.C. 154(b) by 0 days.

(21) Appl. No.: 10/683,050

(22) Filed: Oct. 10, 2003

(65) Prior Publication Data

US 2004/0132953 A1 Jul. 8, 2004

Related U.S. Application Data

(60) Provisional application No. 60/418,152, filed on Oct. 11, 2002.

(51) Int. Cl.
*C08G 18/22* (2006.01)

(52) U.S. Cl. .......................... 528/57; 528/59; 521/125; 521/159; 521/902; 544/193; 544/220; 544/905

(58) Field of Classification Search ................ 544/193, 544/220, 905; 528/57, 59; 521/125, 159, 521/902
See application file for complete search history.

(56) References Cited

U.S. PATENT DOCUMENTS

| | | | | | |
|---|---|---|---|---|---|
| 3,965,051 | A | * | 6/1976 | Markusch et al. | 521/100 |
| 4,025,466 | A | * | 5/1977 | Jourquin et al. | 521/115 |
| 4,981,880 | A | * | 1/1991 | Lehmann et al. | 521/174 |
| 5,175,228 | A | * | 12/1992 | Wang et al. | 528/48 |
| 5,905,151 | A | * | 5/1999 | Slack et al. | 544/222 |
| 5,985,981 | A | | 11/1999 | Alexander et al. | 524/507 |

FOREIGN PATENT DOCUMENTS

| DE | 19650044 | * | 6/1998 |
|---|---|---|---|
| GB | 1386399 | * | 7/1971 |

OTHER PUBLICATIONS

Szycher; Handbook of Polyurethanes; 1999; pp. 13-10, 13-11.*
Klempner et al; Polymeric Foams; 1991; p. 122.*

* cited by examiner

*Primary Examiner*—Rachel Gorr
(74) *Attorney, Agent, or Firm*—Michael R. Huber; Arthur M. Reginelli

(57) ABSTRACT

A method of preparing an adhesive, the method comprising combining an isocyanate, a polyhydroxyl phenol-containing compound, a polyol, and a trimerization catalyst.

22 Claims, No Drawings

TWO-PART POLYURETHANE ADHESIVE FOR BONDING INSULATION BOARDS TO A ROOF DECK

This application gains benefit from U.S. Provisional Application No. 60/418,152, file on Oct. 11, 2002.

TECHNICAL FIELD

This invention relates to two-part polyurethane adhesives for bonding insulation boards to a roof deck.

BACKGROUND OF THE INVENTION

In flat or low-slope roofing applications, insulation boards are typically adhered directly to a roof deck, which is most commonly constructed using concrete or steel. The insulation boards are then covered with a weather resistant membrane. Efficiently adhering insulation boards to roof decks is accomplished by spraying an adhesive onto the roof deck and then applying insulation boards to the sprayed surface. Polyurethane is typically the adhesive of choice, where the term polyurethane refers to both those compounds including urethane bonds, isocyanurate bonds, or both.

Unfortunately, it is difficult to control the open time of polyurethane adhesives. Open time is the amount of time that the polyurethane has tack, which is an adhesive's ability to form chemical bonds with a substrate. Tack typically begins when the polyurethane reactants are contacted, and it ends when the reaction has gone to completion. Where the rate of reaction is fast, open time is typically very short. On the other hand, where the reaction rate is retarded or delayed, the open time can be extended, but insufficient tack and green strength are likely to result. This is problematic because tack and green strength are required for efficient insulation of the boards.

SUMMARY OF THE INVENTION

In general the present invention provides an adhesive prepared by combining an isocyanate, a polyhydroxyl phenol-containing compound, a conventional polyol, and a trimerization catalyst.

The present invention also includes an adhesive prepared by combining an isocyanate prepolymer with at least one trimerization catalyst.

The adhesives of this invention exhibit various performance characteristics that facilitate adhering construction boards, such as insulation boards, to other construction materials such as a roof deck. The ability to apply the adhesive over a relatively large temperature range is an exemplary characteristic. Another advantageous characteristic is that the adhesive can be applied from a two-part spraying apparatus having separate vessels without the need for a proportioning pump.

DETAILED DESCRIPTION OF ILLUSTRATIVE EMBODIMENTS

In a first embodiment, a polyurethane adhesive is formed by combining an isocyanate, a polyhydroxyl phenol-containing compound, a conventional polyol, and a trimerization catalyst. Preferably, this adhesive if formed by reacting an isocyanate with a polyol blend (i.e., a masterbatch), wherein the polyol blend includes at least one polyhydroxyl phenol-containing compound and at least one conventional polyol, in the presence of at least one trimerization catalyst.

Blowing agents, solvents, and other conventional polyurethane catalysts can also be employed, although the reaction advantageously proceeds in the absence of solvents and blowing agents. Advantageously, the polyol blend, isocyanate, and catalyst are generally miscible with one another and generally form a homogeneous liquid mixture. It is believed that the polyhydroxyl phenol-containing compound acts to compatibilize the isocyanate and conventional polyol.

Useful isocyanates include compounds having at least one isocyanate functionality (NCO), including polymeric or monomeric isocyanates. Preferably, isocyanates having three NCO functionalities are employed (i.e., tri-functional isocyanates). Examples of monomeric isocyanates include toluene diisocyanate (TDI), diphenylmethane diisocyanate (MDI), hexamethylene diisocyanate (HDI), 1,6-hexane diisocyanate, and isophorone diisocyanate (IPDI). An example of a polymeric isocyanate includes polymeric diphenylmethane diisocyanate (polymeric MDI). Polymer MDI can be purchased under the name Rubinate™ 1850 or 9257 (ICI Polyurethane, Inc.; West Deptford, N.J.), and trimers of 1,6-hexane diisocyanate are available under the tradename Desmodur™ (Bayer Fiber Organics and Rubber; Akron, Ohio). Polymeric isocyanates with high 2,4 content are commercially available as Rubinate™ 9485 and Rubinate™ 9433.

Polyhydroxyl phenol-containing compounds include at least two hydroxyl groups attached to one or more phenol substituents. Non-limiting examples of these compounds include phenolic resins, m-dihydroxybenzene (resorcinol), p-dihydroxybenzene (quinol), and o-dihydroxybenzene (catechol).

Phenolic resins, which derive from the polymerization of alkyl phenols and formaldehydes, are preferably employed in. In synthesizing phenolic resins, the ratio of alkyl phenol to formaldehyde is typically about 1.5:1. Phenolic resins are commercially available and can be purchased under the tradename SP 560™, SP 1068™, or SP 1090™ (Schenectady International: Schenectady, N.Y.), or under the name Dyphene™ 8318, Dyphene™ 8330, or Dyphene™ 8340 (PMC Specialties Group, Inc.; Cleveland, Ohio). Resol resins are also useful. A resol resin is the reaction product of an alkyl phenol and formaldehyde where the ratio of alkyl phenol to formaldehyde is less than about 1:1.

Useful polyols include compounds having at least one isocyanate-reactive functionality. Any polyol conventionally employed in the production of polyurethanes can be used. This includes both polyether polyols and polyester polyols, as well as those containing primary and secondary hydroxyl groups. In preferred embodiments, the conventional polyols include blends of primary and secondary polyols. Conventional polyols can have from two to about six hydroxyl functionalities, but it is preferred that the polyol contain from about two to about three hydroxyl functionalities. Inasmuch as the adhesive of the first embodiment includes both a conventional polyol and the polyhydroxyl phenol-containing compound, the term conventional polyol, or simply polyol, will refer to those polyols other than the polyhydroxyl phenol-containing compound.

Polyols are widely available, and non-limiting examples include Stepanol™ PS2502A (Stephan Chemical Co.; Northfield, Ill.), which is a primary polyester polyol or Voranol™ 800, 490, 360 or 220–260 (Dow Chemical Co.; Midland, Mich.), which are secondary polyether polyols. Non-limiting exemplary blended polyols include Poly-G VHP™ 85–36, Poly-G VHP™ 55–37, Poly-G VHP™

55–173, and Poly-G VHP™ 83–26 (Arch Incorporated; Indianapolis, Ind.), which are blends of primary and secondary polyether polyols.

Trimerization catalysts include those compound employed to expedite and facilitate the trimerization of isocyanates into isocyanurate rings. Useful trimerization catalysts include alkali metal phenolates, alkali metal carboxylates, and alkoxides. The phenolates may also be referred to as phenoxides. Exemplary alkali metals include lithium, sodium, potassium, rubidium, cesium, and francium. Exemplary phenolate ligands include p-nonylphenolate, p-octylphenolate, p-tert-butylphenolate, and various alkylphenol-formaldehydes. Preferred alkali metal phenolates include potassium, sodium, and lithium p-nonylphenolate. Alkali metal phenolates, such as potassium p-nonylphenoxide, can be formed from the reaction of p-nonylphenol and potassium hydroxide, preferably within toluene or ethyl acetate. Alkali metal carboxylates such as potassium, sodium, and lithium carboxylates include salts of 2-ethylhexanoic acid, acetic acid, propionic acid butyric acid and the like.

Conventional polyurethane catalysts include those catalysts typically employed in the art to expedite or facilitate the reaction between ethylene oxide or propylene oxide polyols and isocyanates. Conventional polyurethane catalysts include, but are not limited to, $tin^{+4}$ salts such as dibutyltin dilaurate, dimethyltin dilaurate and dibutyltin diacetate. These catalysts are commercially available under the tradename Formrez SUL-4(Witco Corp; Greenwich, Conn.), and Dabco T-12 (Air Products; Allentown, Pa.). Certain compounds can act as both the polyol and catalyst component. These compounds include primary amine terminated polyols, which are available under the name Jeffamine T-5000, and autocatalytic secondary and primary terminated polyols such as Jeffamine R-350-X.

The blowing agents that can be employed include physical blowing agents, chemical blowing agents, or both. The physical blowing agents can include water, hydrocarbons such as pentane, propane and butane, fluorocarbons, hydrofluorocarbons such as HFC-1349, chlorofluorocarbons, hydrochlorofluorocarbons, nitrogen, and liquid carbon dioxide. An exemplary blowing agent is 1,1-dichloro-1-fluoro ethane, which is commercially available under the tradename Genetron™ 1416 (Allied Signal Chemical; Morristown, N.J.).

When solvents are employed, organic/nonpolar solvents are preferably used as carriers. Examples include acetone, toluene, and methylethylketone.

Other useful additives or ingredients include, but are not limited to, plasticizers such as alkyl phthalates, diacid esters, epoxidized soybean oil (ESO), and methyl formate. Many plasticizers are commercially available such as Plasthall™ DOS, Plasthall™ DIDG, and Plasthall™ P-670 (C.P. Hall Co; Chicago, Ill.). Other plasticizers that may be employed include those sold under the tradename Santicizer™ 160, 261, and 278 (Monsanto Chemical Co.; St. Louis, Mo.); Piccovar™ AP-10 (Loos and Dilworth, Inc.; Bristol, Pa.); Sundex™ 840 (Sunoco; Philadelphia, Pa.); Wingtack™ 10 (Goodyear; Akron, Ohio); and Benzoflex™ 9–88 SG (Velsical Chemical Corp.; Rosemont, Ill.).

While these additional additives may be employed, the polyurethane adhesives can advantageously be formed in the absence of a solvent and in the absence of an elastomeric matrix or binder. In such an instance, blowing agents, which are typically employed in the formation of polyurethane foams, may be employed. Also, plasticizers and solvents may be employed to modify the adhesive's rate of reaction.

In this first embodiment, the functional groups of the polyol blend and isocyanate can be employed in a 1:1 ratio so as to achieve a one to one reaction between —NCO functionalities and —OH functionalities. It is preferred, however, to use an excess of the polyol blend, where this excess includes an —OH functionality to —NCO functionality ratio of about 2.5:1. If the preferred tri-functional isocyanate is employed, then sufficient polyol is preferably added to provide at least one —OH functionality for each —NCO functionality; and an —OH functionality to —NCO functionality ratio of 4.5:1 is preferred.

On a weight basis, from about 6.6 to about 10 parts by weight of the preferred tri-functional isocyanate component is reacted with about 16 to about 24 parts by weight of the polyol blend. Preferably, from about 7.5 to about 9.1 parts by weight of the preferred tri-functional isocyanate component is reacted with about 16 to about 22 parts by weight of the polyol blend.

The ratio of the polyhydroxyl phenol-containing compound to the conventional polyol is generally, on a weight basis, from about 10:0.5 to about 10:2, and preferably from about 10:1 to about 10:1.5.

Trimerization catalysts are preferably employed in a catalytically effective amount so as to cure the polyhydroxyl phenol-containing compounds. For example, an alkali metal phenolate can be used in an amount from about 0.1 to about 5 parts by weight per 100 parts by weight of a phenolic resin, and more preferably from about 1 to about 3 parts by weight per 100 parts by weight of a phenolic resin.

When a conventional polyurethane catalyst is employed, it is preferably used in a catalytically effective amount so as to cure a conventional polyol. For example, a conventional polyurethane catalyst can be used in an amount ranging from about 0.05 to about 3.0 parts by weight per 100 parts by weight of the conventional polyol, and more preferably, an alkali metal phenolate can be used in amounts ranging from about 1 to about 2 parts by weight per 100 parts by weight of the conventional polyol.

When physical blowing agents are employed, they can be used in amounts ranging from about 0.1 to about 25 parts by weight, and preferably from about 0.1 to about 20 parts by weight, based on the total weight of the adhesive mixture.

Effective amounts of conventional additives can be determined by those skilled in the art without undue experimentation.

Regarding this first embodiment, the polyol blend, which includes the polyhydroxyl phenol-containing compound and the conventional polyol, is contacted with an isocyanate at or near the location where the adhesive is used. Typically, the adhesive will develop sufficient green strength within about 30 seconds and then fully cure within about five minutes. Once the polyol blend and isocyanate are contacted and the adhesive develops sufficient green strength, an insulation board or other construction material can be contacted with the adhesive.

In a second embodiment, an adhesive is prepared by combining an isocyanate prepolymer with at least one catalyst that can effect the trimerization of isocyanates, i.e., form isocyanurates. This combination preferably occurs at the time that the adhesive is sprayed for use. Therefore, as is common with urethane or isocyanurate chemistry, the prepolymer may be provided in an A-side component and the catalyst may be provided in a B-side component. The A-side component can include unreacted polyol, isocyanate, optional mono-alcohol (mono-ol), and optional plasticizer. The B-side can include plasticizers and other conventional additives used in the art.

A prepolymer can be prepared by adding an excess of isocyanate to an isocyanate-reactive compound such as polyol. Useful isocyanates that may be employed in preparing a prepolymer include those disclosed above with respect to the first embodiment. Preferred isocyanates include tri-functional isocyanates.

Useful isocyanate-reactive compounds include those disclosed above with respect to the first embodiment. Preferred isocyanate-reactive compounds include polyols, which are commercially available under the tradenames Poly-G VHP™ 55–37 and Poly-G VHP™ 55–173 (Arch Incorporated; Indianapolis, Ind.).

Additionally, the preferred prepolymers may be prepared by combining a mono-ol with the isocyanate and the isocyanate-reactive compound. Useful mono-ols include, but are not limited to, propanol, butanol, pentanol, hexanol, heptanol, octanol, nonanol, and decanol. Decanol is a preferred mono-ol and can be purchased under the tradename Epal™ 10 (Amoco Chemicals; Chicago, Ill.).

Relative amounts of the prepolymer reactants can be varied so long as the prepolymer includes excess —NCO functionalities relative to —OH functionalities. Preferably, at least two —NCO functionalities per isocyanate-reactive functionality are employed, and more preferably at least three —NCO functionalities per isocyanate-reactive functionality are employed. When employed, mono-ols are typically used in an amount from about 3 to about 17 parts by weight per parts by weight of the polyol component. Preferably, the mono-ols are used in an amount from about 7 to about 10 parts by weight per parts by weight of the polyol component.

From about 25 to about 80 parts by weight of the preferred tri-functional isocyanate component is reacted with about 100 parts by weight of the polyol component, which can include polyols and mono-ols. Preferably, from about 30 to about 60 parts by weight of the preferred tri-functional isocyanate component is reacted with about 100 parts by weight of the polyol component.

In preparing the prepolymer, a temperature ranging from about 30° C. to about 70° C. is preferred. A temperature ranging from about 40° C. to about 60° C. is more preferred.

Sequential addition is preferably employed when a mono-ol is used to prepare the prepolymer. A non-limiting example of sequential addition includes combining and mixing the polyol and isocyanate ingredients and then later adding the mono-ol. Preferably, the reaction between the isocyanate and the isocyanate- reactive compound is allowed to proceed for 10 hours at room temperature, preferably 16 hours and more preferably 24 hours, before the mono-ol is added. Alternatively, the prepolymer can be formed at 70° C. for 1 to 4 hours, with the mono-ol then being added and mixed for another 16 hours at ambient temperatures. Sequential addition of mono-ols advantageously alters the physical properties of the finished adhesive by making it less brittle.

The B-side comprises an isocyanate trimerization catalyst and optional blowing agents, solvents, plasticizers and other additives commonly used in urethane or isocyanurate adhesives. Useful trimerization catalysts, plasticizers, blowing agents, solvents, and conventional additives include those disclosed above with respect to the first embodiment. The preferred trimerization catalyst is potassium nonylphenoxide.

The trimerization catalyst, e.g. an alkali metal phenolate, should generally be employed in a catalytically effective amount so as to trimerize the prepolymer's excess isocyanates. For example, the alkali metal phenolate can be used in an amount from about 0.1 to about 10 parts by weight of the isocyanate functionalities, and preferably from about 1 to about 5 parts by weight of the isocyanate functionalities.

Physical blowing agents, when employed, should be used in an amount ranging from about 0.1 to about 25 parts by weight, and preferably from about 0.1 to about 20 parts by total weight of the adhesive mixture.

Effective amounts of plasticizers and other conventional additives can be determined by those skilled in the art without undue experimentation.

The preferred two-part polyurethane adhesives of this invention have the following characteristics.

The initial-cream time is from about 0 to about 10, preferably from about 0.5 to about 5, and more preferably from about 1 to about 3 seconds. The final-rise time is from about 1 to about 60, more preferably from about 5 to about 30, and more preferably from about 10 to about 15 seconds. The gel time is from about 1 to about 10, preferably from about 2 to about 5, and more preferably from about 3 to about 7 minutes. The tack time is from about 3 seconds to about 5 minutes, preferably from about 9 seconds to about 4 minutes, and more preferably from about 15 seconds to about 3 minutes. The re-stick time is greater than about 1 minute, preferably greater than about 3 minutes, and more preferably greater than about 5 minutes for a ½ inch gap.

Also, the preferred sprayable two-part polyurethane adhesive provides a green strength that will overcome at least 12 pounds of force per 144 inch$^2$ area at the edge of an adhered insulation board and at least 72 pounds of force per 144 square inches at the center of an adhered insulation board. Preferably, the green strength will overcome at least 12 pounds of force per 144-inch$^2$ area at the edge of an adhered insulation board and at least 72 pounds of force per 144 square inches at the center of an adhered insulation board. Further, the preferred sprayable two-part polyurethane adhesive provides a shear adhesion, which is the force needed to separate two horizontal surfaces when bound by the adhesive, of at least 0.1 pounds per square inch after 15 seconds from application and increase in a nonlinear fashion to 0.5 pounds per square inch after 3 minutes; after about 5 minutes, the shear adhesion of the adhesive should exceed the cohesive strength of the insulation such that the interior of the insulation itself will fail before the adhesive will fail. Still further, the preferred adhesive achieves an FM 1–90 wind-resistance rating for isocyanurate insulation adhered to concrete, steel, BUR smooth surface, another insulation board, and a sprayed in place PU foam.

Initial-cream time is the time required for the adhesive to change from a liquid bead to a foamed bead when applied to a surface, and it is measured beginning from when the adhesive is introduced onto a surface. Final-rise time is the time required for the liquid adhesive to complete foaming such that the foam no longer changes in height or width after being applied to a surface, and it is measured beginning from when the adhesive is introduced onto a surface. Gel time is the point in time when the foam bead can no longer be crushed and thereby form a flat surface and the cells within the foam cannot be broken and interdiffused into the insulation. Tack time is the time during which the adhesive bead can be crushed between the decking and insulation causing the foam to collapse. It is at this time that the two surfaces can be pulled apart in a vertical direction and the adhesive will exhibit elongated strands. Re-stick time is the time frame in which the adhesive can reattach itself to the deck and insulation board after being separated by a gap. This measurement is reported as a function of the size of the gap and the time during which it is possible to re-adhere the two surfaces. An FM 1–90 wind-resistance rating is achieved when an adhered board passes a 12'×24' wind uplift table with one layer of 2" isocyanurate insulation board that is adhered to galvanized or painted-steel decking. The pass occurs when the pressure applied to the deck is 90-pounds/square foot and is sustained for 60 seconds.

The two-part adhesive can be applied to a substrate via a small-particulate spray, a large-particulate spray or splatter, or a cylindrical bead applied in one-or-more streams. The cylindrical bead is preferred because it does not atomize any particulate into the air. Additionally, the adhesive can be applied at temperatures ranging from about 40° F. to about 100° F.

In order to demonstrate the practice of this invention, the following examples have been prepared and tested. The examples should not, however, be viewed as limiting the scope of the invention. The claims will serve to define the invention.

EXAMPLES

Example 1

A polyurethane adhesive was formed by contacting an isocyanate component with a polyol component by using an AST machine (Adhesive Systems Technology; Minneapolis, Minn.), which is a dispensing machine that extrudes the components through a wand that contains a static mixer at its tip. Table I provides the ingredients within each component.

TABLE I

| Ingredients | Amount (parts by weight) |
|---|---|
| Isocyanate Component | |
| Diphenyl methane diisocyanate (MDI) | 69 |
| Plasticizer | 45 |
| Polyol Component | |
| Phenolic Resin | 20 |
| Polyol | 80 |
| Dibutyltin Dilaurate | 0.1–1.0 |
| Potassium Nonylphenoxide | 1.0–3.0 |

The diphenyl methane diisocyanate (MDI) was purchased under the tradename Rubinate™ 1850 (ICI Polyurethane, Inc.; West Deptford, N.J.), and the plasticizer was an alkyl phthalate, which was purchased under the tradename Santicizer™ 160 (Monsanto). The phenolic resin was purchased under the tradename Dyphene™ (PMC), and the polyol was purchased under the tradename Poly G-2-265 (Arch Chemicals Inc.; Indianapolis, Ind.), which is a secondary polyether polyol.

Example 2

Potassium nonylphenoxide, a catalyst for effecting trimerization of isocyanate, was synthesized by placing the three ingredients shown in Table II into a quart bottle and heating to 100° C. for seven hours with occasional shaking. At the end of seven hours, a clear pale-yellow solution was obtained. Analyzing the solution revealed that it contained 1.96 mmol/gram of potassium nonylphenoxide and also that the solution had a pH of 12.6.

TABLE II

| Ingredients | Amount (parts by weight) |
|---|---|
| p-Nonylphenol (0.50 M) | 110 |
| Diethylene Glycol | 110 |
| Potassium Hydroxide (0.49 M) | 31 |

Example 3

Liquid prepolymers were produced by mixing effective amounts of isocyanate and polyol. Table III provides the ingredients and amounts used in synthesis, as well as the properties of the resulting prepolymer.

TABLE III

| | Amount (parts by weight) TRIAL NO. | |
|---|---|---|
| Ingredients | 1 | 2 |
| Polyol A | 250 | — |
| Polyol B | — | 330 |
| MDI 1 | 305.8 | 83.8 |
| PROPERTIES | | |
| % NCO, Actual | 10.50 | 3.2 |
| 100% Prepolymer | Slow Flow | Fluid |
| Soluble in Ethyl Acetate (10%) | Yes | Yes |
| Ethyl Acetate Visual Viscosity | Fluid | Fluid |
| Soluble in Methyl Formate (10%) | Yes | Yes |
| Soluble in Blowing Agent-141 B | Partially | Yes |
| Solubility in Methyl Formate; 3 weeks @ RT | Yes | Yes |

Polyol A was purchased under the tradename Poly-G VHP™ 53–173 (Arch), which is a diol. Polyol B was purchased under the tradename Poly-G VHP™ 55–37 (Arch), which is a diol. The MDI 1 was a di-functional polyisocyanate and purchased under the tradename RUBINATE™ 1850.

Example 4

Polyurethane adhesives were formed by contacting the prepolymer prepared in Trial No. 2 with potassium nonylphenoxide. Various plasticizers were employed as carriers for the potassium nonylphenoxide. Table IV provides the ingredients and amounts used in synthesis.

TABLE IV

| | Amounts (parts by weight) TRIAL NO. | | |
|---|---|---|---|
| Ingredients | 3 | 4 | 5 |
| A-SIDE | | | |
| Prepolymer (Trial No. 2) | 50 | 50 | 50 |
| Blowing Agent 141B | 20 | 20 | 20 |
| B-SIDE | | | |
| Plasticizer 1 | 50 | — | — |
| Dimethylphthalates | — | 50 | — |
| Epoxidized Soybean Oil | — | — | 50 |
| Potassium Nonylphenoxide | 0.5 | 0.5 | 0.5 |

TABLE IV-continued

| PROPERTIES | | | |
|---|---|---|---|
| Gel Time, sec. | 30 | 30 | 180 |
| Elasticity, D-gel time | Yes | Yes | Yes - v. good |
| ISO-ISO ADHESION | | | |
| (30 sec. Open/24 hr. closed) | 100% facer | 50% facer + 50% Adhesive Tear | 100% facer |
| (60 sec. Open/24 hr. closed) | 100% facer | Not Tested | 100% facer |
| (120 sec. Open/24 hr. closed) | 100% facer | Not Tested | 100% facer |
| (180 sec. Open/24 hr. closed) | 100% facer | Not Tested | Gel |
| (240 sec. Open/24 hr. closed) | 100% facer | Not Tested | Gel |
| (300 sec. Open/24 hr. closed) | 100% facer | Not Tested | Gel |

The blowing agent, a fluorinated hydrocarbon (HCFC), was purchased from Allied Signal Chemical, under the tradename Genetron 141B. Plasticizer 1, dialkylphthalates, was purchased from BASF, under the tradename Platinol 911.

Example 5

A polyurethane adhesive was formed by contacting a prepolymer with potassium nonylphenoxide. Methyl formate was used as a carrier for the trimerization catalyst. Table V provides the ingredients and amounts used in synthesis.

TABLE V

| Ingredients | Amounts (parts by weight) TRIAL NO. 6 |
|---|---|
| A-SIDE | |
| Polyol B | 330 |
| MDI 1 | 84 |
| Plasticizer | 132 |
| B-SIDE | |
| Methyl formate | 548 |
| Potassium nonylphenoxide | 9.1 |

Polyol B was purchased under the tradename Poly-G VHP™ 55–37. MDI 1 was purchased under the tradename Rubinate™ 1850.

Example 6

Fluid prepolymers were prepared by employing monomeric alcohols in addition to polyols. Table VI provides the ingredients and amounts used in preparation. Sequential addition was not employed in preparing the trials in Table VI.

TABLE VI

| | TRIAL NO. | | | | | |
|---|---|---|---|---|---|---|
| | 7 | 8 | 9 | 10 | 29 | 26 |
| Polyol B | 360 | 325 | 300 | 282 | 325 | 300 |
| Decanol | 12.5 | — | — | — | 25 | 50 |
| Methanol | — | 2.5 | 5 | 30 | — | — |

TABLE VI-continued

| MDI 1 | 122 | 115 | 140 | 449 | 146 | 200 |
|---|---|---|---|---|---|---|
| PROPERTIES | | | | | | |
| % NCO, titration | Not tested | 4.92 | 5.94 | 12.71 | 5.6 | 6.85 |
| Fluid, Y/N | Yes | Yes | Yes | Yes | Yes | Yes |
| Clear, Y/N | Yes | Yes | Yes | Yes | No | No |

Polyol B was purchased under the tradename Poly-G VHP™ 55–37 and employed at a concentration of 0.65 mmol/gram. The decanol was purchased under the tradename Epal™ 10 (Amoco Chemicals; Chicago, Ill.) and employed at a concentration of 6.29 mmol/g. The MDI 1 was purchased under the tradename Rubinate™ 1850 and employed at a concentration of 7.17 mmol/gram.

Example 7

Polyurethane adhesives were formed by contacting the prepolymers prepared in Table VI with potassium nonylphenoxide. Various plasticizers, such as aromatic oil, were tested for efficiency in carrying the trimerization catalyst. Prepolymers that were prepared with 1-decanol yielded effective adhesives when combined with the potassium nonylphenolate. Table VII provides the ingredients and amounts used in synthesizing the adhesives.

TABLE VII

| Insulation | Trial No. | | | | | |
|---|---|---|---|---|---|---|
| Adhesives | 30 | 31 | 32 | 33 | 34 | 35 |
| Part A | | | | | | |
| Trial 29 | — | — | — | 30 | — | — |
| Trial 26 | — | — | 30 | — | 30 | 30 |
| Trial 8 | 30 | — | — | — | — | — |
| Trial 9 | — | 30 | — | — | — | — |
| Blowing Agent 141B | — | — | — | — | 10 | — |
| PART B | | | | | | |
| Plasticizer 6 | 30 | 30 | — | — | — | — |
| Catalyst 93–75(1) | 0.5 | 0.5 | 0.5 | 0.5 | 0.5 | 1.0 |
| Plasticizer 2 | — | — | 30 | 30 | 30 | 30 |
| PERFORMANCE | | | | | | |
| Elasticity | Hard | Hard | Very elastic | Very elastic | Very elastic | Very elastic |
| 30 (sec) | Facer | Facer | Facer | Facer | Facer | Facer |
| 60 | Facer | Facer | Facer | Facer | Facer | Facer |
| 90 | Facer | Facer | Facer | Facer | Facer | Facer |
| 120 | Facer | Facer | Facer | Facer | Facer | Gel |
| 150 | Facer | Facer | Facer | Facer | Facer | Gel |
| 180 | Facer | Facer | Facer | Facer | Facer | Gel |
| Gel time (sec) | 180+ | 180+ | 180+ | 180+ | 180+ | 120 |

The best results were achieved using a prepolymer comprising polyol that was purchased under the tradename Poly-G VHP™ 55–37; decanol that was purchased under the tradename Epal™ 10; and plasticizer 2, which is an aromatic oil, that was purchased under the tradename Sundex 840 (Sunoco; Philadelphia, Pa.). Additionally, the blowing agent, a fluorinated hydrocarbon (HCFC), was purchased from Allied Signal Chemical, under the tradename Genetron™ 141B. Plasticizer 6 was purchased from BASF under the tradename PIATINOL™ 911. Catalyst 93–75(1) was purchased from Royal Chemical (Macedonia, Ohio).

Example 8

Prepolymers were prepared by contacting at least polyol and isocyanate; decanol was used selectively as a third ingredient as shown in Table VIII. Table VIII provides the ingredients and amounts employed.

TABLE VIII

| | Amounts (parts by weight) TRIAL NO. | | | |
|---|---|---|---|---|
| Ingredients | 11 | 12 | 13 | 14 |
| Polyol B | 300 | 300 | 300 | 300 |
| MDI 2 | 72.6 | — | 72.6 | — |
| MDI 3 | — | 73.0 | — | 73.0 |
| Decanol | — | — | 31.0 | 31.0 |
| PROPERTIES | | | | |
| % NCO | 3.95 | 3.95 | 2.24 | 2.43 |

In trials 11 and 12, the alcohols and isocyanate were placed into a one-quart bottle and placed on a roller overnight. In trials 13 and 14 sequential additive was employed, the polyol and MDI were mixed for 4 hours at 72° F., and then the decanol was added and mixed overnight. All of the formulations resulted in free flowing liquid prepolymers.

Polyol B was purchased under the tradename Poly-G VHP™ 55–37 and employed at a concentration of 0.65 mmol/gram. The decanol was purchased under the tradename Epal™ 10 and employed at a concentration of 6.29 mmol/gram. MDI 2 was purchased under the tradename Rubinate™ 9433 and employed at a concentration of 7.52 mmol/gram. MDI 3 was purchased under the tradename Rubinate™ 9485 and employed at a concentration of 7.48 mmol/gram.

Example 9

Performance characteristics were tested for polyurethane adhesives prepared by contacting the prepolymer prepared in Trial 11, potassium nonylphenoxide, and plasticizer. Table IX provides the ingredients and amounts used in synthesis, as well as the properties of the adhesive.

TABLE IX

| | Amounts (parts by weight) TRIAL NO. | |
|---|---|---|
| Ingredients | 15 | 16 |
| A-SIDE | | |
| Prepolymer (Trial 11) | 30 | 30 |
| B-SIDE | | |
| Plasticizer 2 | — | 30 |
| Plasticizer 3 | 30 | — |
| Potassium Nonylphenoxide | 0.5 | 0.5 |
| PROPERTIES | | |
| Adhesive | Elastic | Elastic |
| Cure Time | Facer | Facer |
| 30 | Facer | Facer |
| 60 | Facer | Facer |
| 90 | Facer | Facer |

TABLE IX-continued

| 120 | Facer | Facer |
|---|---|---|
| 150 | Facer | Facer |
| 180 | Facer | Facer |
| Gel time, sec | 180+ | 180+ |

Plasticizer 2 was purchased under the tradename Sundex™ 840. Plasticizer 3 was purchased under the tradename Sunparv 2280 (Sunoco), a highly refined paraffinic type rubber processing oil.

Example 10

Distinct prepolymers were synthesized by contacting polyols with MDI. Table X provides the ingredients and amounts used in preparing each prepolymer.

TABLE X

| | Amounts (parts by weight) TRIAL NO. | | |
|---|---|---|---|
| Ingredients | 17 | 18 | 19 |
| Polyol B | 150 | 150 | — |
| Polyol A | 30 | — | — |
| Polyol C | — | 150 | 300 |
| MDI 2 | 71.5 | 73.2 | 73.7 |
| PROPERTIES | | | |
| Adhesive | Elastic | Elastic | Elastic |
| Viscosity (#3 spindle @ 4 r.p.m.) | 12,000 | Not measured | Not measured |
| Cure Time, sec | 180+ | 150 | 120 |
| 30 | 100% Facer | Mostly facer, Some Adhesives | Mostly facer, Some Adhesives |
| 60 | 100% Facer | Mostly facer, Some Adhesives | Mostly facer, Some Adhesives |
| 90 | 100% Facer | Mostly facer, Some Adhesives | Mostly facer, Some Adhesives |
| 120 | 100% Facer | Mostly facer, Some Adhesives | Mostly Adhesives, Some Facer |
| 150 | 100% Facer | Mostly Adhesives, Some Facer | Mostly Adhesives, Some Facer |
| 180 | 100% Facer | Mostly Adhesives, Some Facer | Mostly Adhesives, Some Facer |
| % NCO, titration | 5.94 | 3.93 | 4.32 |

Poly B was purchased under the tradename Poly-G VHP™ 55–37 and employed at a concentration of 0.65 mmol/gram. Polyol A was purchased under the tradename Poly-G VHP™ 55–173 and employed at a concentration of 3.16 mmol/gram. Polyol C was purchased under the tradename Poly-G VHP™ 55–36 and employed at a concentration of 0.66 mmol/gram. MDI 2 was purchased under the tradename Rubinate ™ 433 and employed at a concentration of 7.52 mmol/gram.

Example 11

Prepolymers were prepared by contacting a polyol with an isocyanate component, and the time required for preparation was measured. Specifically, this time relates to the time required for the polyisocyanate and polyol to react and therby form polyurethane. The prepolymers were completely formed after either 2.5 hours @70° C. or 48 hours at 23° C. Table XI provides the ingredients and amounts used in preparation, as well as the resulting properties.

TABLE XI

| | Amounts (parts by weight) TRIAL NO. | |
|---|---|---|
| Ingredients | 20 | 21 |
| Polyol B | 150 | 150 |
| Polyol A | 30 | 120 |
| MDI 2 | 71.5 | 177.5 |
| PROPERTIES | | |
| % NCO, titration | Not tested | Not tested |
| 24 hrs @ RT | 6.63 | Not tested |
| 48 hrs @ RT | 6.07 | Not tested |
| 24 hrs @ RT + 2 hours @ 70 C. | 6.01 | Not tested |
| 2.5 hrs @ 70 C. | 5.61 | 7.84 |

Polyol B was purchased under the tradename Poly-G VHP™ 55–37 and employed at a concentration of 0.65 mmol/gram. Polyol A was purchased under the tradename Poly-G VHP™ 55–173 and employed at a concentration of 3.16 mmol/gram. The MDI 2 was purchased under the tradename Rubinate™ 9433 and employed at a concentration of 7.52 mmol/gram.

Example 12

The effect of various plasticizers on the strength of polyurethane adhesives was tested. The adhesives were prepared by contacting the prepolymer prepared in Trial 20 with a trimerization catalyst, potassium nonylphenoxide, and a plasticizer. Table XII provides the ingredients and amounts used as well as the resulting properties.

TABLE XII

| | Amounts (parts by weight) TRIAL NO. | |
|---|---|---|
| Ingredients | 22 | 23 |
| A-SIDE | | |
| Prepolymer (Trial 20) | 30 | 30 |
| B-SIDE | | |
| Plasticizer 4 | 30 | — |
| Plasticizer 5 | — | 30 |
| Potassium Nonylphenoxide | 1.0 | 1.0 |
| PROPERTIES | | |
| Performance ISO to ISO | | |
| Adhesive | Elastic | Elastic |
| Cure Time, sec. | 180+ | 180+ |
| 60 | 100% F | 100% F |
| 120 | 100% F | 100% F |
| 180 | 100% F | 100% F |
| Performance, ISO to Stainless Steel | | |
| 60 | Good | Fair |

Plasticizer 4 was purchased under the tradename Piccovar™ AP-10 (Loos and Dilworth, Inc.; Bristol, Pa.). Plasticizer 5 was purchased under the tradename Wingtack™ 10 (Goodyear; Akron, Ohio).

Example 13

Prepolymers were prepared using the sequential addition of polyol, n-decanol, and MDI. The procedure for sequential addition of mono alcohols (n-decanol) consisted of placing the polyol and MDI in a quart bottle and rotating in a 70° C. oven for 2.5 hours. n-Decanol was added after 2.5 hours at 70° C. The contents were then placed on rollers and the temperatures decreased from 70° C. to 22° C. over several hours. In all of the trials, clear liquid prepolymers were formed.

Table XIII provides the ingredients and amounts used in preparation.

TABLE XIII

| | Amount (parts by weight) TRIAL NO. | |
|---|---|---|
| Ingredients | 24 | 25 |
| Polyol B | 325 | 325 |
| n-Decanol | 25 | 25 |
| MDI 1 | — | 122 |
| MDI 2 | 116 | — |

Polyol B was purchased under the tradename Poly-G VHP™ 55–37 and employed at a concentration of 0.65 mmol/gram. The n-decanol was purchased under the tradename Epal™ 10 and employed at a concentration of 6.29 mmol/gram. MDI 1 was purchased under the tradename Rubinate™ 1850 and employed at a concentration of 7.17 mmol/gram. MDI 2 was purchased under the tradename Rubinate™ 9433 and employed at a concentration of 7.52 mmol/gram.

Example 14

The adhesives were prepared by contacting the prepolymer prepared in Trials 24 and 25 with a trimerization catalyst and plasticizers. Table XIV provides the ingredients and amounts used as well as the resulting properties of the adhesives.

TABLE XIV

| Insulation | TRIAL NO. | | | |
|---|---|---|---|---|
| Adhesives | 36 | 37 | 38 | 39 |
| PART A | | | | |
| Prepolymer (Trial 24) | 30 | 30 | — | — |
| Prepolymer (Trial 25) | — | — | 30 | 30 |

TABLE XIV-continued

| Insulation Adhesives | TRIAL NO. | | | |
|---|---|---|---|---|
| | 36 | 37 | 38 | 39 |
| PART B | | | | |
| Plasticizer 4 | 30 | — | 30 | — |
| Plasticizer 6 | — | 30 | — | 30 |
| Cat 44-13 | 1.0 | 1.0 | 1.0 | 1.0 |
| Performance, ISO to ISO | | | | |
| Adhesive | High elongation | v. high elongation | Low elongation | Low elongation |
| Cure Time (sec) | | | | |
| 60 | 100% Facer | 100% Cohesive | 50% Facer/ 50% cohesive | 50% Facer/ 50% cohesive |
| 120 | 100% Facer | 100% Cohesive | 50% Facer/ 50% cohesive | 50% Facer/ 50% cohesive |
| 180 | 100% Facer | 100% Cohesive | 50% Facer/ 50% cohesive | 50% Facer/ 50% cohesive |
| Performance, ISO to Stainless Steel | | | | |
| 60 | 100% Facer | 100% Cohesive | 100% Adhesive, off metal | 100% Adhesive, off metal |

Plasticizer 4 was purchased under the tradename Piccovar™ AP-10 (Loos and Dilworth). The Cat 44-13 was purchased from Royal as potassium nonylphenoxide in toluene at a concentration of 2.0 mmol per gram. Plasticizer 6 was purchased under the tradename Benzoflex™ 9–88 SG (Velsicol Chemical Corp.; Rosemont, Ill.)

Example 15

Prepolymers were prepared by sequentially adding mono-ol to a solution comprising polyol and MDI. Table XV provides the ingredients and amounts used in preparing each prepolymer.

TABLE XV

| | Amount (parts by weight) TRIAL NO. | |
|---|---|---|
| Ingredients | 27 | 28 |
| Polyol B | 325 | 325 |
| 1-Butanol | 11.62 | 11.62 |
| MDI 2 | 116.0 | 137 |

In preparing the prepolymers illustrated above, the polyol and polyisocyanate were placed in a quart bottle and rotated in a 70° C. oven for 2.5 hours. Then the monomeric alcohol, 1-butanol, was added and rolled overnight at a temperature range that decreased from 70° C. to 22° C. over several hours. The resulting prepolymers were found to be clear yellow fluids.

Polyol B was purchased under the tradename Poly-G VHP™ 55–37 and employed at a concentration of 0.65 mmol/gram. The MDI 2 was purchased under the tradename Rubinate™ 9433 and employed at a concentration of 7.52 mmol/gram. The 1-butanol was delivered at a concentration of 13.51 mmol/gram.

Table XVI shows the performance characteristics of adhesives that employ the prepolymers from Table XV.

TABLE XVI

| Insulation Adhesives | TRIAL NO. | | | | | | | |
|---|---|---|---|---|---|---|---|---|
| | 40 | 41 | 42 | 43 | 44 | 45 | 46 | 47 |
| PART A | | | | | | | | |
| Prepolymer (Trial 27) | 30 | 30 | — | — | 30 | 30 | — | — |
| Prepolymer (Trial 28) | — | — | 30 | 30 | — | — | 30 | 30 |
| PART B | | | | | | | | |
| Plasticizer 4 | 30 | — | 30 | — | — | — | — | — |
| Plasticizer 7 | — | 30 | — | 30 | — | — | — | — |
| Plasticizer 8 | — | — | — | — | 30 | — | 30 | — |
| Plasticizer 9 | — | — | — | — | — | 30 | — | 30 |
| Cat 44-13 | 1.0 | 1.0 | 1.0 | 1.0 | 1.0 | 1.0 | 1.0 | 1.0 |

TABLE XVI-continued

| Insulation Adhesives | TRIAL NO. | | | | | | | |
|---|---|---|---|---|---|---|---|---|
| | 40 | 41 | 42 | 43 | 44 | 45 | 46 | 47 |
| Performance, ISO TO ISO | | | | | | | | |
| Adhesive | High elongation | High elongation | High elongation | High elongation | High elongation | High elongation | High elongation | High elongation |
| Cure Time, Sec. | | | | | | | | |
| 60 | 100% F | 85% F/15% C | 75% F/25% C | 80% F | 70% F | 100% F | 70% F | 100% F |
| 120 | 100% F | 85% F/15% C | 75% F/25% C | 80% F | 70% F | 100% F | 70% F | 100% F |
| 180 | 100% F | 85% F/15% C | 75% F/25% C | 80% F | 70% F | 100% F | 70% F | 100% F |
| Performance, ISO to Stainless Steel | | | | | | | | |
| 60 | 100% F | 100% F | 100% F | 100% F | 80% F | 100% F | 80% F | 100% F |

Plasticizer 4 was purchased under the tradename PICCOVAR™ AP-10 (Loos and Dilworth). Plasticizer 7 was purchased under the tradename Piccolastic™ A-5 (Eastman/Hercules). Plasticizer 8 was purchased under the tradename Abalyn™ (Eastman/Hercules). Plasticizer 9 was purchased under the tradename Hercolyn™ D (Eastman/Hercules). The Cat 44-13 was purchased from Royal as potassium nonylphenoxide in toluene at a concentration of 2.0 mmol per gram.

Regarding the performance characteristics presented in Table XVI, "F" represents Facer, "A" represents Adhesive Tear, and "C" represents Cohesive Tear.

Various modifications and alterations that do not depart from the scope and spirit of this invention will become apparent to those skilled in the art. This invention is not to be duly limited to the illustrative embodiments set forth herein.

What is claimed is:

1. A method for preparing an adhesive, the method comprising:
   combining an isocyanate prepolymer with at least one trimerization catalyst including a potassium, sodium, or lithium p-nonylphenoxide, where said step of combining takes place at a temperature of from about 40° F. to about 100° F.

2. The method of claim 1, where the isocyanate prepolymer is a reaction product of an excess of isocyanate reacted with an isocyanate-reactive compound.

3. The method of claim 2, where the prepolymer is prepared by sequentially adding a mono-ol after an initial reaction between an isocyanate and an isocyanate-reactive compound.

4. The method of claim 3, where said reaction takes place in the presence of a plasticizer.

5. The method of claim 1, where the trimerization catalysts is potassium nonylphenoxide.

6. A method for preparing an adhesive, the method comprising:
   combining an isocyanate prepolymer, a mono-ol, and a trimerization catalyst including a potassium, sodium, or lithium p-nonylphenoxide, where said step of combining takes place at a temperature of from about 40° F. to about 100° F.

7. The method of claim 6, where the isocyanate prepolymer is a reaction product of an excess of isocyanate reacted with an isocyanate-reactive compound.

8. The method of claim 7, where the prepolymer is prepared by sequentially adding a mono-ol after an initial reaction between an isocyanate and an isocyanate-reactive compound.

9. The method of claim 8, where said reaction takes place in the presence of a plasticizer.

10. The method of claim 6, where the trimerization catalysts is potassium nonylphenoxide.

11. The method of claim 1, where said step of combining includes combining from about 0.5 to about 1.0 parts by weight trimerization catalyst per 30 parts by weight prepolymer.

12. The method of claim 6, where said step of combining includes combining from about 0.5 to about 1.0 parts by weight trimerization catalyst per 30 parts by weight prepolymer.

13. The method of claim 1, where said step of combining results in an adhesive have an initial-cream time of from about 0 to about 10 seconds, a final rise time of from about 1 to about 60 seconds, and a gel time from about 1 to about 10 minutes.

14. The method of claim 6, where said step of combining results in an adhesive have an initial-cream time of from about 0 to about 10 seconds, a final rise time of from about 1 to about 60 seconds, and a gel time from about 1 to about 10 minutes.

15. The method of claim 1, where said step of combining results in an adhesive characterized by a green strength that will overcome at least 12 pounds of force per 144 square inches at the edge of an adhered insulation board and at least 72 pounds of force per 144 square inches at the center of an adhered insulation board, a shear adhesion of at least 0.1 pounds per square inch after 15 seconds from application, and achieve a FM1–90 wind-resistance rating for isocyanate insulation.

16. The method of claim 6, where said step of combining results in an adhesive characterized by a green strength that will overcome at least 12 pounds of force per 144 square inches at the edge of an adhered insulation board and at least 72 pounds of force per 144 square inches at the center of an adhered insulation board, a shear adhesion of at least 0.1 pounds per square inch after 15 seconds from application, and achieve a FM1–90 wind-resistance rating for isocyanate insulation.

17. A method for preparing an adhesive, the method comprising:
   combining a compound bearing an isocyanate functionality with at least one trimerization catalyst including an alkali metal phenoxide, where said step of combining takes place at a temperature of less than 100° F., where the compound bearing an isocyanate functionality is contained within an A-side stream of reactants, where the catalyst is contained in a B-side stream of reactants, and where the B-side stream of reactants includes a solvent selected from the group consisting of acetone, toluene, and methyl ethyl ketone.

18. The method of claim 1, where the isocyanate prepolymer is contained within an A-side stream of reactants, and where the catalyst is contained in a B-side stream of reactants, and where the B-side stream of reactants includes at least one additional ingredient selected from the group consisting of blowing agents, solvents, and plasticizers.

19. The method of claim 18, where the B-side stream of reactants includes a solvent, and where the solvents is selected from the group consisting of acetone, toluene, and methyl ethyl ketone.

20. The method of claim 17, where the at least one catalyst consists essentially of an alkali metal phenoxide.

21. The method of claim 17, where the B-side stream further includes at least one additional ingredient selected from the group consisting of blowing agents and plasticizers.

22. The method of claim 21, where the B-side stream includes a plasticizer selected from the group consisting of alkyl phthalates, diacid esters, epoxidized soybean oil, and methyl formate.

* * * * *